Aug. 26, 1969 E. G. NASSIMBENE 3,463,878

VIDEO RECORDING APPARATUS

Filed Jan. 13, 1967

INVENTOR.
ERNIE G. NASSIMBENE

BY John H. Holcombe
ATTORNEY

United States Patent Office 3,463,878
Patented Aug. 26, 1969

3,463,878

VIDEO RECORDING APPARATUS

Ernie G. Nassimbene, San Jose, Calif., assignor to International Business Machines Corporation, Armonk, N.Y., a corporation of New York Filed Jan. 13, 1967, Ser. No. 609,110
Int. Cl. H04n 5/76
U.S. Cl. 178—6.6 10 Claims

ABSTRACT OF THE DISCLOSURE

Helical scan recording apparatus for recording video pictures transversely across a magnetic recording tape. The tape is wrapped completely around the rotary head unit which transversely scans across the entire width of the tape. Each transverse track comprises one video frame of two fields. The apparatus records two video fields on each helical track of the tape, leaving a gap between the fields at the center of the tape for linear recording thereat of audio and control tracks. To accommodate the gap, the bottom seven lines of the 256-line video picture are eliminated for both fields.

BACKGROUND OF THE INVENTION

Field of the invention

The preesnt invention relates to apparatus for recording information signals on a magnetic recording medium, and more particularly to apparatus for recording audio and visual television information signals on a magnetic tape.

Description of the prior art

In normal recording of television information on magnetic recording tape, the audio track and the synchronizing or control track are located along the edges of the tape. As a result, the prior art helical scan video recording apparatus is designed to wrap the magnetic recording tape around the rotary head such that the rotary head path never intersects the control or audio tracks.

One prior art approach is to wrap the tape about the rotary video head at a very shallow angle and direct the tape away from the head before the rotary head path intersects the control or audio tracks at either edge of the tape. The shallow angle requires that the longitudinal distance between tracks be greater than otherwise required in order to maintain a specified track density. In addition, the considerable time period required while the rotary head traverses the space between the end and beginning of the portion of tape wound on the drum eliminates between 5% and 10% of the video picture for one field.

To retain the complete picture, another prior art system utilizes two record/playback heads disposed 180 degrees apart on the rotary head member with guiding apparatus to wrap the magnetic recording tape approximately 180 degrees about the surface of the guide drum in which the rotary head moves. In some cases, the tape is wrapped more than 180 degrees about the guide drum, but switching circuitry controls the operation of two heads such that each head scans the moving magnetic tape over only a 180-degree arc. When a head completes the 180-degree scan, it is disconnected and the other head scans the moving magnetic tape for a 180-degree arc.

To record one video frame comprising two fields transversely across the recording tape in a 180-degree scan, so as to avoid intersecting the audio and synchronizing tracks which are along the edges of the tape, and guide drum and rotating head must be of extremely large diameter. To provide a recorder with a smaller physical the drum may be reduced in diameter by recording only one field per transverse track. With this format, it is apparent that twice as many tracks are to be recorded for the same amount of video information.

To maintain the reduced physical size of the drum and rotary head, and yet economize on the excessive amount of tape used above, a type of prior art recorded axially offsets the recording heads. Only one head is utilized to record a single field in the first one-half revolution of the rotary head. Neither head is connected during the second half of the revolution and the second field goes unrecorded. On the playback, the first head plays back the recorded field during the first half of the revolution of the rotary head. During the second half of the revolution, the second head, being offset, engages the same track of the recording tape which has moved one-half track. The second head now replays the same field, which is then utilized by the video system as the second field of the television frame. Hence, this system trades smaller physical size and economy of tape for the lowering of quality of the video picture by one-half.

SUMMARY OF THE INVENTION

An object of the present invention is therefore to provide an improved video magnetic recording apparatus having a small diameter rotary head which records both fields of a television frame on one track to thereby economize in the use of magnetic recording tape and yet attain a high quality television picture.

Apparatus is provided for recording or reproducing audio, video and control information on a magnetic recording tape. The apparatus includes a magnetic transducer mounted for rotation about a central axis. Feeding and guide means are provided to move a magnetic recording tape helically about the central axis at approximately the diameter formed by the rotary path of the magnetic transducer for approximately the full 360 degrees thereof, the path traced by the magnetic transducer on the magnetic recording tape extending transversely across the entire width of the tape. Stationary magnetic transducers are provided spaced from the rotating magnetic transducer for recording or reproducing audio and control information on the magnetic recording tape. Guide means is provided for guiding the magnetic tape in contact with the stationary transducing means such that the track traced by the stationary transducers along the magnetic tape as it is moved thereacross extends parallel to the direction of motion of the tape and is approximately centered with respect to the edges thereof. Means is provided to synchronize the rotation of the rotating magnetic transducer with the longitudinal motion of the magnetic recording tape. Transmission means is provided to transmit audio and control signals to or from the stationary magnetic transducers. Video transmission means is provided to transmit video information to or from the rotating transducer. Control means is provided to prevent operation of the video transmission means when the rotary transducer is at or near an intrsection with the control and audio tracks or either edge of the magnetic recording tape.

DESCRIPTION OF THE PREFERRED EMBODIMENTS

Figure 1:
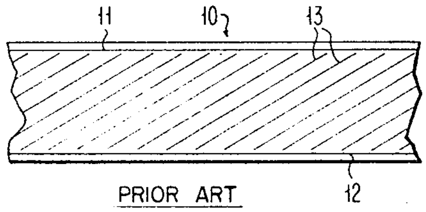
FIGURE 1 is a schematic view of a strip of magnetic tape recorded by prior art video recording apparatus.

FIGURE 1 shows schematically the configuration of the recorded patterns made on video magnetic recording tape 10 by prior art helical scan video recorders. The audio track 11 is linearly recorded along one edge of the tape and the control or synch track 12 is linearly recorded along the other edge of the tape. The video information is recorded along transverse tracks 13 extending between the audio and synch tracks. FIGURE 1 is a schematic showing and is not to scale. In fact, the transversely recorded video tracks 13 are actually closer together and much longer, for example, approximately 24 inches long, extending transversely along a tape one inch in width. The tracks 13 are thus disposed at a much shallower angle with respect to the tape edge than that shown in FIGURE 1.

To record or play back such tapes, prior art recorders were designed to prevent actual intersection of the path of the video recording head with either the audio track 11 or control track 12.

Figure 2:
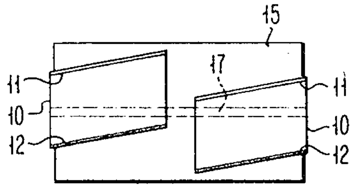
FIGURE 2 is a schematic frontal view of one type of prior art video recording apparatus which may be adapted to utilize the present invention.
Figure 3:
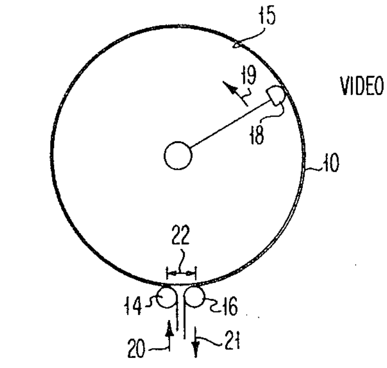
FIGURE 3 is a schematic top view of the apparatus of FIGURE 2.

FIGURES 2 and 3 illustrate one prior art system for recording the magnetic patterns of FIGURE 1. The magnetic tape 10 has been previously recorded and shown in FIGURE 1 with the audio track 11 and synch or control track 12. The tape is threaded around guide roller 14, around the circumferential surface of stationary drum 15 and around guide roller 16. The guide rollers 14 and 16 are arranged to direct the tape in a shallow helical angle about path 17 of rotary head 18. This shallow angle is designed so that the tape 10 is guided away from the head 18 before the rotary head path 17 intersects the control track 11 or the synch track 12. Rotary head 18 rotates in the counterclockwise direction as shown by arrow 19 and magnetic tape 10 is moved about drum 15 in the clockwise direction as shown by arrows 20 and 21.

As will be explained hereinafter with respect to applicant's invention, the relatively shallow angle of the helix formed by the tape 10 as it is wrapped around drum 15 requires that the longitudinal distance between tracks be greater than otherwise required.

Further, as the head 18 rotates in the direction of arrow 19, contact with the tape 10 is lost over the distance of gap 22. Each transverse track 13 recorded by head 10 comprises either a complete video frame or a video field, a video frame including two interlace fields with the required horizontal and vertical flyback signals. The beginning of the first field of each frame is normally recorded immediately after the rotary head 18 contacts the tape at guide roller 16. The two fields are then continuously recorded as rotary head 18 rotates in the direction of arrow 19, until guide roller 14 is reached. At this point, the head 18 loses contact with tape 10 and no further recording occurs until the head again contacts the tape at guide roller 16. The video information for the final part of the second field of the recorded frame continues to be supplied to head 18 as the head traverses the gap 22. This information, comprising between five and ten percent of the video picture of the second field for each video frame, is not recorded and is, therefore, lost. To accommodate this loss in the video display, the display set must be adjusted to eliminate the bottom portion of the video picture. Hence, five to ten percent of the total video picture is lost.

Figure 4:
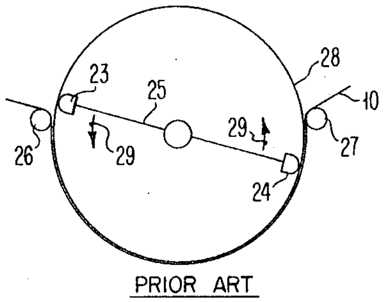
FIGURE 4 is a schematic top view of another prior art video recording apparatus.

In an effort to retain the complete picture, the prior art system of FIGURE 4 has been employed.

The apparatus of FIGURE 4 utilizes two record/playback heads 23, 24 disposed 180 degrees apart on a rotary head member 25. Guide rollers 26 and 27 are disposed such that the tape 10 is wrapped helically approximately 180 degrees about the surface of guide drum 28 in which the rotary heads are rotated as shown by arrows 29. Switching circuitry controls the operation of the two heads 23 and 24 such that each head scans the moving magnetic tape 10 over only a 180 degree arc. When one head completes the 180 degree scan, it is disconnected by the switching circuitry and the other head is connected to thereby scan the moving magnetic tape for the 180 degree arc. On each 180 degree scan, each head traces a complete track 13 including both fields of a video frame. Therefore, the distance traced by each head 23, 24 in its 180 degree scan must be equal to the distance traced by head 18 of FIGURE 3 in its 360 degree scan, thereby requiring that the circumference of drum 28 be twice the circumference of drum 15 of FIGURE 3.

To provide a recorder with a smaller physical size, the drum size may be reduced by two by recording only one field per transverse track. However, this system requires twice as many tracks to be recorded transversely across the tape for the same number of video frames. An excessive amount of tape must therefore be used for recording video information.

One type of prior art recorder utilizes the small size drum system of FIGURE 4 and yet reduces the amount of tape required to a normal amount by lowering the quality of the video picture by one half. This recorder offsets the recording heads 23, 24 by one half the distance between the tracks. To record a video signal, only one head 23 is utilized. This head records a single field in the first one half revolution of the arm 25. Neither head is connected during the second half of the revolution and the second field goes unrecorded. On playback, the first head 23 plays back the recorded field during the first 180 degrees of the revolution of the rotary head. During the second 180 degree half of the revolution, the second head 24, being offset, engages the same track of the recording tape which has now moved one half track. The second head now replays the same field again, which is then utilized by the video system as the second field of the television frame, thereby providing a video picture of one-half normal quality.

Figure 5:
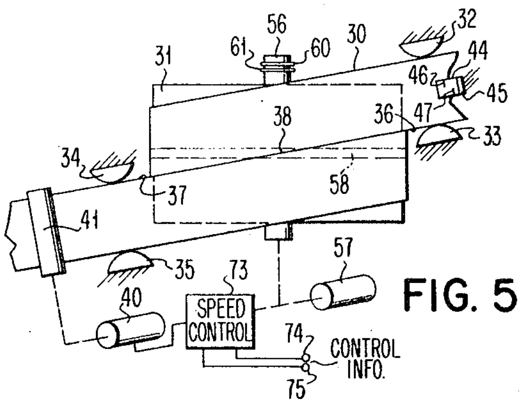
FIGURE 5 comprises a schematic frontal view of the video recording apparatus of the present invention.
Figure 6:
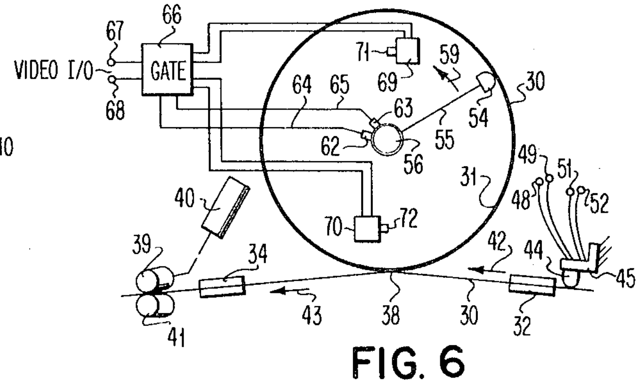
FIGURE 6 is a schematic top view of the video recording apparatus of FIGURE 5.

The apparatus of the present invention shown in FIGURES 5 and 6, overcomes all of the above-cited disadvantages of the prior art video recorders by utilizing a compact drum with a single rotary head and attains a high quality, nearly complete, video picture. The apparatus of FIGURES 5 and 6 is designed to record with a format different from that of the prior art. The format recorded by the subject apparatus is illustrated by referring additionally to FIGURE 7.

Figure 7:
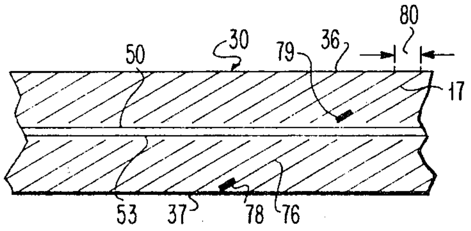
FIGURE 7 is a schematic representation of the tracks recorded on a magnetic tape by the video recording apparatus of FIGURES 5 and 6.

Referring now to FIGURES 5 through 7, a video magnetic recording tape 30 is wrapped helically about the circumference of a guide drum 31. Tape guides 32–35 direct the tape 30 such that it follows a specific path around drum 31. The helical angle of the tape as it is thus wound around the drum is somewhat steeper than that of the prior art, allowing the tape to be wrapped 360 degrees around the drum. The angle is such that the lower edge 36 of the input side of the tape approximately touches the upper edge 37 of the output side of the tape at point 38 where they meet.

A capstan 39 is driven by motor 40 and, in combination with pinch roller 41, operates to advance the tape around drum 31 as shown by arrows 42 and 43.

A stationary record/playback head 44 is fixedly mounted on stationary bracket 45 so as to contact the center of tape 30. The head 44 includes two recording or playback gaps 46 and 47. The core forming gap 46 is connected to audio input/output terminals 48, 49 and records audio track 50 on a tape 30. The core forming gap 47 is connected to control or synch input/output terminals 51, 52 and records control or synch track 53 on tape 30.

A video record/playback head 54 is fixedly mounted on arm 55 which, in turn, is fixedly attached to shaft 56.

The shaft 56 is mounted for rotation about its axis in a conventional manner such that the axis of rotation of shaft 56 is coincident with the axis of drum 31. A motor 57 rotates the shaft 56 such that video head 54 is driven in an opening 58 of drum 31, as shown by arrow 59.

Since tape 30 is wrapped completely about the surface of drum 31, head 54 continually contacts the surface of the tape as the head is driven along path 58.

Video head 54 is electrically connected by means of wires to slip rings 60 and 61. Stationary brushes 62 and 63 makes continuous electrical contact with slip rings 60 and 61, respectively, which rotate with shaft 56. The brushes 62 and 63 are connected by wires 64 and 65 to a gating circuit 66. The gating circuit is, in turn, connected to viedo input/output terminals 67 and 68. Control lines to the gating circuit are connected from switches 69 and 70.

Gating circuit 66 normally connects video input/output terminals 67 and 68 to wires 64 and 65, allowing transmission of video signals in either direction depending upon whether the information is being recorded or played back.

A sensing means 71 is arranged to operate switch 69 the instant that arm 55 comes into exact alignment therewith. The sensing means 71 may comprise a mechanical arm which is moved when the arm 55 comes into contact with it, or may comprise a photoelectric arrangement, the light beam of which is interrupted by the passage therethrough of arm 55, or any other suitable arrangement may be employed. A similar sensing means 72 is provided to operate switch 70.

When so operated, switches 69 or 70 send a control signal to gating circuit 66. The gating circuit then opens, or disconnects, the connection between wires 64, 65 and video input/output terminals 67, 68. This connection is maintained open for a certain predetermined period of time, at the conclusion of which, the connections are reestablish. The switches 69 and 70 thus operate to interrupt the flow of video information to or from video head 54 for specific segments of the path 58 of head 54, as will be explained hereinafter.

A speed control apparatus 73 is connected to shaft 56 to detect the rotational position of video head 54 and is connected to control information input terminals 74 and 75. The control information inputs supply synchronizing information derived from control input/output terminals 51 and 52. Speed control apparatus 73 compares the synchronizing information with the rotational position of video head 54 to control the speed of motor 40 to maintain synchronism between the synch information and the position of video head 54. The speed control thereby maintains accurate synchronization between the longitudinal position of tape 30 and the rotational position of video head 54.

With the tape 30 and rotary head 54 maintained in synchronism by speed control 73, video head 54 rotates, recording or playing video track 76 on the tape 30. As the video head approaches control and synch track 53, sensing means 71 operates switch 69 which gate circuits 66 to interrupt the video information. When gate circuit 66 reestablishes transmission, video head 54 traces track 77 along the remainder of the tape until approaching the very edge thereof. At this point, sensing means 72 operates switch 70 which again causes gate circuit 66 to interrupt the video transmission. Thus, the head 54 is prevented from recording or playing information extremely close to lower edge 36 at the input end of tape 30 and the upper edge 37 of the output end of tape 30. When gate circuit 66 reestablishes the video transmission, video head 54 traces the next following track.

In recording, the video information and control information are duly synchronized to cause the vertical flyback signals signalling the beginning of field 1 of the video frame to be recorded at the beginning of the first track 76 recorded. These flyback signals are illustrated schematically by spot 78. The vertical flyback signals beginning the second field of the video frame thus occur at the beginning of the second track 77 recorded on the opposite side of the control and audio tracks 50 and 53. This flyback information is denoted by spot 79.

As a result, the last 7 lines of the 256 line video picture, less than three percent, are eliminated for both fields of the video frame by switches 69 and 70.

In operation, video magnetic recording tape 30 is threaded helically 360 degrees around the circumference of drum 30, between tape guides 32 and 33, between tape guides 34 and 35 and between capstan 39 and pinch roller 41.

The capstan and pinch roller then move together to engage tape 30 therebetween. Motor 40 then rotates capstan 39 to draw the tape by stationary head 44 and around drum 31, as shown by arrows 42 and 43. The head 44 then engages tape 30 to record or play audio information from track 50 and control or synchronization information from track 53. This data appears on audio input/output terminals 48 and 49 and on control input/output terminals 51 and 52, respectively.

Motor 57 then rotates shaft 56 and arm 55 and video record/playback head 54 which are attached to shaft 56, in the direction of arrow 59. Video head 54 thus moves in path 58 along the periphery of drum 31, thereby engaging magnetic recording tape 30 for the full 360 degrees around drum 31.

Speed control 73 detects the rotary position of shaft 56 and compares that to control information supplied at terminals 74 and 75. The speed control 73 utilizes this comparison to control the speed of motor 40 such that the instantaneous position of tape 32, as defined by the synchronization information derived from terminals 51 and 52, is accurately synchronized with the instantaneous position of video head 54 along path 58.

The video information is then transmitted between video input/output terminals 67, 68 and video head 54 via slip rings 60, 61, brushes 62, 63, wires 64, 65 and gating circuit 66.

Assuming that speed control 73 has brought tape 30 and rotary head 54 into exact synchronism and that rotary head 54 has just passed position 38 on path 58, the video head 54 then traces tracks 76 on tape 30. This track constitutes the first field of a video frame and begins with the vertical flyback signals 78. As the video head 54 is rotated in the direction of arrow 59 such that it approaches control track 53, sensing means 71 detects the presence of arm 55. Sensing means 71 then operates switch 69 to open gate circuit 66. The gate circuit 66 thus disconnects wires 64 and 65 from video input/output terminals 67 and 68 for a predetermined time. This predetermined time is preset such that connection is reestablished just after video head 54 crosses audio track 50. The video head then traces track 77 which begins with the vertical flyback signal 79 denoting the beginning of the second field of the same video frame as recorded on track 76.

Video head 54 continues to trace the remainder of track 77 until the lower edge 36 of the input portion of tape 30 is approached. At this time, sensing means 72 signals the presence of arm 55 which operates switch 70 to open gating circuit 66. Again, the circuit remains open for a predetermined time, during which the video head 54 crosses the junction 38 between the edges of the tape. The gating circuit closes after the predetermined time, whereupon video head 54 traces another track, constituting the first field of the immediately following frame.

The described apparatus therefore records and plays both fields of a video frame, thereby providing a high quality video picture. In addition, only a small portion (less than 3 percent) of the video picture is eliminated, this being such a slight amount that it is not noticed in normal viewing, in contradistinction to the large amount of picture eliminated in prior art apparatus. Due to the slightly sharper angle taken by the tape as it is helically wrapped about drum 31, the distance 80 between tracks taken along the longitudinal dimension of the tape is less than that of prior art for a given track density (the closeness of the tracks). Thus, less tape is used for a given video program. In addition, the described apparatus utilizes the smaller drum 31 and a single video head 54.

Referring back to FIGURES 2 and 3, it will be remembered that the video display must be adjusted to eliminate the bottom 5% to 10% of the video picture to accommodate gap 22.

The apparatus of FIGURES 2 and 3 may be adapted in accordance with the above description with respect to FIGURES 5–7 to reduce the gap 22 substantially and to thereby increase the amount of the video picture which may be viewed.

Specifically, the helical angle at which the tape 10 is wrapped around drum 15 is increased similarly to that of FIGURE 5, such that the path 17 of the rotary video head 18 intersects the edges of tape 10. The apparatus is arranged to record two video fields comprising a complete video frame in one revolution of video head 18. The stationary head for recording or playing the audio and control data is arranged similarly to head 45 of FIGURES 5 and 6 to thereby record audio and control tracks 50 and 53 of FIGURE 7. Video input/output gating means is also provided as shown by video input/output gating apparatus 66–72 of FIGURE 5.

Thus, the audio and control tracks are recorded at the center of tape 10 instead of at the edges thereof. The switching means 70, 72 and gate 66 therefore operate only long enough to allow the rotary head 18 to cross the tape edges and not the edges plus audio and control tracks. In addition, the input and output portions of the tape are now offset, allowing guide members 14 and 16 to be brought closer together. In fact, they may be mounted coaxially at the position corresponding to point 38 on FIGURE 5.

In this manner, gap 22 is reduced to zero and the video signal is only interrupted for a short predetermined time by the gating apparatus 66, 70, 72. Likewise, the gating apparatus 66, 69, 71 interrupts the video signal for a like predetermined time when the path of rotary head 18 intersects the audio and control tracks 50, 53.

The amount of video picture eliminated is thus about one-third of that eliminated by the prior art at gap 22.

As an added feature, the sharper helical angle of the tape causes tracks 76, 79 to be recorded at a sharper angle than prior art tracks 13 for the two field per scan system. Hence, for a given track density, the distance 80 between tracks is reduced, requiring less tape for a given video program.

While the invention has been particularly shown and described with reference to preferred embodiments thereof, it will be understood by those skilled in the art that various changes in form and details may be made therein without departing from the spirit and scope of the invention.

What is claimed is:

1. Magnetic recording apparatus for recording separate signals of substantially different frequencies on magnetic tape comprising:

first transducing means for generating a first varying magnetic recording field in response to the low frequency one of said signals, second transducing means for generating a second varying magnetic recording field in response to the high frequency one of said signals, means for moving said magnetic tape longitudinally past said first transducing means and past said second transducing means, and means for repeatedly scanning said second transducing means across the surface of said magnetic tape along a path extending from one edge thereof to the other at an angle to the direction of movement of the tape whereby said second magnetic recording field records along said angularly extending path, wherein the improvement thereto comprises:

means for guiding said magnetic tape with respect to said first transducing means such that said first transducing means traces a path on said magnetic tape parallel to the direction of motion thereof and approximately centered with respect to the edges thereof, whereby said first magnetic recording field records along said centered path; and control means responsive to the position of said second transducing means along said angularly extending path for interrupting said generation of said second magnetic recording field as said second transducing means crosses said centered path and as said second transducing means crosses the edges of said magnetic tape.

2. The magnetic recording apparatus of claim 1 further including:

high frequency transmission means for transmitting said high frequency signal to said second transducing means; and wherein said control means includes means for detecting specific predetermined positions reached by said second transducing means along said path and means responding to said detection by inhibiting operation of said high frequency transmission means as said second transducing means crosses said centered path and as said second transducing means crosses the edge of said magnetic tape.

3. The magnetic recording apparatus of claim 2 wherein:

said high frequency transmission means includes gating means, having a control input means, for selectively transmitting or inhibiting transmission of said high frequency signal to said second transducing means in response to a control signal at said input terminal; and said control means includes means for supplying said control signal to said control input means of said gating means, said means for control signal normally causing said gating means to transmit said high frequency signal, means for detecting specific predetermined positions reached by said second transducing means along said path, and means responding to said detection by changing said control signal to thereby cause said gating means to inhibit transmission of said high frequency signal to said second transducing means as said second transducing means crosses said centered path and as said second transducing means crosses the edges of said magnetic tape.

4. The magnetic recording apparatus of claim 2 wherein:

said high frequency transmission means includes gating means, having control input means and a timing means, said transmission means normally transmitting said high frequency signal to said second transducing means, said timing means responding to a specified control signal at said control input means to inhibit said transmission of said high frequency signal for a predetermined time period; and said control means includes detecting means for providing said specified control signal upon said second transducing means reaching a specified point along said path immediately prior to crossing said centered path and for providing said specified control signal upon said second transducing means reaching a specified point along said path immediately prior to crossing the edges of said magnetic tape, and means for supplying said specified control signals to said control input means, whereby said timing means inhibits transmission of said high frequency signal as said second transducing means crosses said centered path and as said second transducing means crosses the edge of said magnetic tape.

5. The magnetic recording apparatus of claim 4 wherein:

said separate signals of substantially different frequencies comprise a high frequency signal containing video information and two low frequency signals containing, respectively, audio and control information; and said first transducing means comprises means for generating two separate magnetic recording fields in response, respectively, to said audio information signal and said control information signal, such that said first transducing means traces a path on said magnetic tape comprising two separate and parallel tracks, closely spaced, containing, respectively, audio information and control information.

6. The magnetic recording apparatus of claim 5, additionally including:

synchronizing means for synchronizing said scanning means to said video information such that the first portion of said video information transmitted by said gating means after said predetermined time and recorded by said second transducer immediately after crossing said edges of said magnetic tape and immediately after crossing said centered path comprises the start of a video field.

7. The magnetic recording apparatus of claim 2, said apparatus being additionally capable of playing back first and second previously recorded signals which are respectively arranged along said centered and said angularly extending paths, wherein:

said first transducing means may generate a low frequency playback signal in response to said first previously recorded signal as said guiding means and said moving means cause said centered path of said magnetic tape to be drawn across said first transducing means;

said second transducing means may generate a high frequency playback signal in response to said second previously recorded signal as said scanning means and said moving means cause said second transducing means to scan along said angularly extending path of said magnetic tape; and said high frequency transmission means transmits said high frequency recording and playback signals respectively to and from said second transducing means.

8. The magnetic recording apparatus of claim 7 wherein:

said high frequency recording and playback signals comprise high frequency signals containing video information;

said low frequency recording and playback signals each comprise two low frequency signals containing, respectively, audio and control information; and said first transducing means comprises means for generating two separate magnetic recording fields in response, respectively, to said audio information signal and said control information signal, such that said first transducing means traces a path on said magnetic tape comprising two separate and parallel tracks, closely spaced, containing, respectively, audio information and control information, and comprises means for generating two separate low frequency playback signals in response to said first previously recorded signals comprising, respectively, audio and control information in said two separate and parallel tracks.

9. Apparatus for playing back from a magnetic tape first and second previously recorded signals, said first previously recorded signal being arranged along a path parallel to the longitudinal dimension of said magnetic tape and approximately centered with respect to the edges thereof, and said second previously recorded signal being arranged along a path, said path extending from one edge of said magnetic tape to the other at an angle to said longitudinal dimension thereof, comprising:

means including moving means and guiding means, for moving said tape along a predetermined path;

stationary transducing means located at a predetermined position along said predetermined path in magneto-coupled relationship with said magnetic tape along said centered path, said stationary transducing means generating a low frequency playback signal in response to said first previously recorded signal;

scanning transducing means located at a second predetermined position along said predetermined path for repeatedly scanning across said magnetic tape, and in magneto-coupled relationship therewith, from one edge thereof to the other at an angle such that the path traced by said scanning transducing means is parallel to said angularly extending path of said second previously recorded signal, said scanning transducing means generating a high frequency signal in response to a previously recorded signal along said traced path;

synchronizing means for synchronizing said moving means to said scanning transducer so that said path traced by said scanning transducer essentially coincides with said angularly extending path of said second previously recorded signal such that said high frequency signal generated by said scanning transducer comprises a high frequency playback signal generated in response to said second previously recorded signal;

high frequency transmission means for transmitting said high frequency playback signal to an output; and control means responsive to the position of said scanning transducing means along said angularly extending traced path for inhibiting operation of said high frequency transmission means as said scanning transducing means crosses said centered path and as said scanning transducing means crosses the edges of said magnetic tape.

10. The magnetic recording apparatus of claim 9 wherein:

said first previously recorded signal comprises two separate signals recorded along said centered path on two separate and parallel tracks, closely spaced, containing, respectively, audio and control information;

said second previously recorded signal and said high frequency playback signal contain video information; and said stationary transducing means comprises means in magneto-coupled relationship with each of said parallel tracks along said centered path to generate two separate low frequency playback signals in response to said two separate and parallel tracks, said two low frequency playback signals thereby containing, respectively, audio and control information.

References Cited

UNITED STATES PATENTS

| | | |
|---|---|---|
| 3,020,355 | 2/1962 | Moriya. |
| 3,099,709 | 7/1963 | Barry. |
| 3,188,385 | 6/1965 | Kihara. |
| 3,213,204 | 10/1965 | Okamura. |
| 3,278,678 | 10/1966 | Rank. |
| 3,283,085 | 11/1966 | Lemke. |

ROBERT L. GRIFFIN, Primary Examiner

J. A. ORSINO, Jr., Assistant Examiner

U.S. Cl. X.R.

179—100.2